(12) United States Patent
Muziol et al.

(10) Patent No.: US 7,963,162 B2
(45) Date of Patent: Jun. 21, 2011

(54) 300° C FLOW SENSOR

(75) Inventors: Matthias Muziol, Mainhausen (DE);
Karlheinz Wienand, Aschaffenburg (DE); Karl-Heinz Ullrich, Gross-Umstadt (DE)

(73) Assignee: Heraeus Sensor Technology GmbH, Hanau (DE)

( * ) Notice: Subject to any disclaimer, the term of this patent is extended or adjusted under 35 U.S.C. 154(b) by 138 days.

(21) Appl. No.: 12/538,275

(22) Filed: Aug. 10, 2009

(65) Prior Publication Data

US 2010/0031742 A1 Feb. 11, 2010

(30) Foreign Application Priority Data

Aug. 11, 2008 (DE) .......................... 10 2008 037 206

(51) Int. Cl.
*G01F 1/68* (2006.01)
(52) U.S. Cl. .................................... 73/204.26
(58) Field of Classification Search ............... 73/204.26, 73/204.22, 202.5
See application file for complete search history.

(56) References Cited

U.S. PATENT DOCUMENTS

| | | | |
|---|---|---|---|
| 4,906,965 A | 3/1990 | Murata et al. | |
| 6,079,265 A | 6/2000 | Wienand et al. | |
| 6,382,023 B1 | 5/2002 | Yonezawa et al. | |
| 6,898,969 B2 | 5/2005 | Wienand et al. | |
| 7,219,544 B2 * | 5/2007 | Tanaka et al. | 73/204.26 |
| 7,404,321 B2 * | 7/2008 | Tanaka et al. | 73/204.26 |
| 2002/0071475 A1 | 6/2002 | Betzner et al. | |
| 2004/0190590 A1 | 9/2004 | Wienand et al. | |

FOREIGN PATENT DOCUMENTS

| | | |
|---|---|---|
| DE | 38 29 765 A1 | 3/1989 |
| DE | 103 33 296 A1 | 4/2004 |
| DE | 103 14 705 B3 | 7/2004 |
| DE | 10 2005 061 548 A1 | 7/2007 |
| DE | 20 2007 014 129 U1 | 1/2008 |
| DE | 10 2006 058 425 A1 | 6/2008 |
| EP | 0 775 316 B1 | 10/1999 |
| EP | 0 990 674 A2 | 4/2000 |
| EP | 1 128 168 A2 | 8/2001 |
| EP | 1 431 718 A2 | 6/2004 |
| EP | 1 760 437 A1 | 3/2007 |
| EP | 19 41 244 A1 | 7/2008 |
| WO | 2007/048573 A1 | 5/2007 |
| WO | 2008/000494 A2 | 1/2008 |
| WO | 2008/131890 A2 | 11/2008 |

* cited by examiner

*Primary Examiner* — Jewel Thompson
(74) *Attorney, Agent, or Firm* — Panitch Schwarze Belisario & Nadel LLP

(57) ABSTRACT

A measurement device, particularly an anemometric measurement device, is provided for mounting in an exhaust-gas pipe, particularly an exhaust-gas recirculation pipe. The device includes a ceramic carrier embedded in an injection-molded housing made of plastic, with at least one film resistor mounted on the ceramic carrier on an end opposite the embedding. Electrical connections lead out from the film resistor to the embedded end of the ceramic carrier, and the electrical connections are passed through the injection molding, sealed and mounted within the injection-molded part. Additional components can be used for the sealing and mounting.

16 Claims, 4 Drawing Sheets

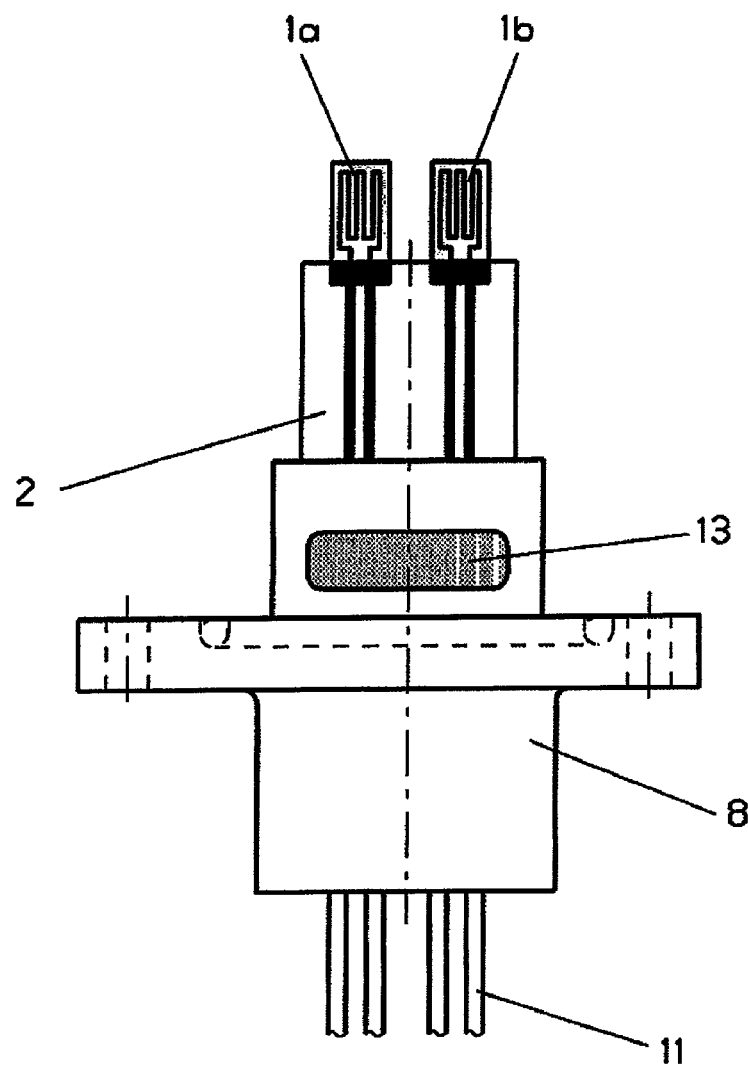
Fig.2
Fig. 2A
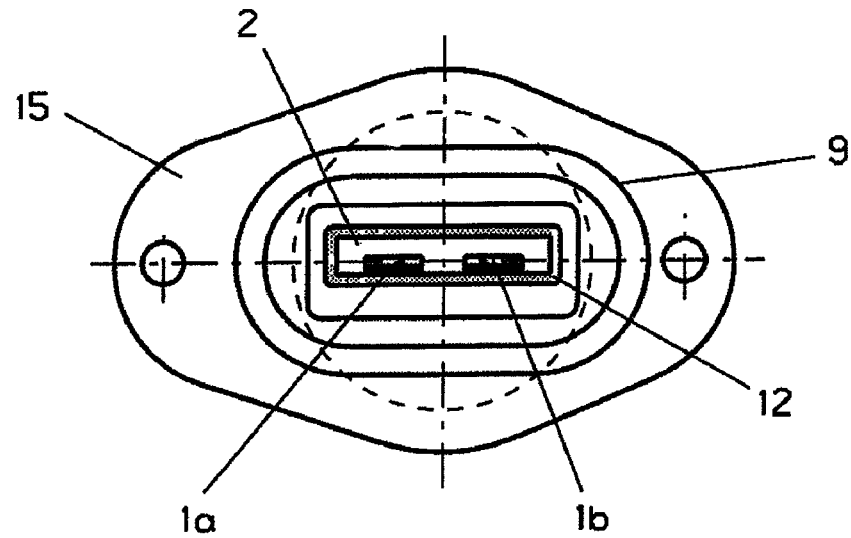

300° C FLOW SENSOR

BACKGROUND OF THE INVENTION

The present invention relates to measurements in exhaust-gas streams, in particular anemometric measurements, for exhaust-gas recirculation in internal combustion engines.

European Patent EP 0 775 316 B1 discloses a hot-film anemometer.

European patent application publication EP 0 990 674 A2 discloses an exhaust-gas recirculation system.

European patent application publication EP 1 431 718 A2, European patent application No. EP 06 806 497, and International patent application publication WO 2008/000494 disclose anemometric measurement devices, and International patent application publication WO 2008/131890 A2 describes a mounting of an anemometric measurement device in an exhaust-gas recirculation pipe.

Simple measurement devices having low temperature requirements and produced in particular with injection-molded housings are suitable only for temperatures up to approximately 140° C. There, a burn-off process for deposits and soot from sensor elements is not possible, because the thin-film measurement elements possibly must be heated actively to 650° C., in order to burn off deposits, in particular soot. During the measurement phase, the sensors are operated at temperatures above the temperature of the exhaust gas. In this way, a plastic housing of the flow sensor may not become overheated.

BRIEF SUMMARY OF THE INVENTION

An object of the present invention comprises providing a flow sensor having a plastic housing, in particular an injection-molded housing, suitable for use in an exhaust-gas duct and whose measurement-active region can be burned off.

The object is achieved by a measurement device, particularly an anemometric measurement device, for use in an exhaust-gas pipe, in particular an exhaust-gas recirculation pipe, in which a ceramic carrier is embedded in an injection-molded housing made of plastic, so that at least one film resistor is mounted on the ceramic carrier on the end opposite the embedding. Electrical connections lead out from this to the embedded end of the ceramic carrier, wherein the electrical connection is guided through the injection molding, sealed and mounted within the injection-molded part, and wherein additional components can be used for the sealing and mounting.

For achieving the object, the film resistors are held on a ceramic intermediate carrier, in particular a plate, wherein the temperature can drop across this plate up to the housing.

The plastic housing is also protected from overheating with respect to the exhaust-gas temperature, in that it is shielded, together with the carrier, with a metal cap in the region of the exhaust gas, wherein the metallic shielding remains spaced from the exhaust-gas pipe with an air gap when the measurement device is mounted. The plastic housing, made in particular by injection molding, is pulled back with respect to the exhaust-gas pipe in or on the end of a connecting piece or shaft on the exhaust-gas pipe, so far that it is located outside of the exhaust-gas pipe. With these measures, it is possible to measure hot exhaust gas flows up to 300° C. with a measurement device having an injection-molded housing and to burn off deposits on the measurement-active region.

According to the invention, the thin-film measurement elements can be optionally heated actively to 650° C. for burning off deposits, without destroying the plastic housing. Preferably, thin-film measurement elements of the film resistors are positioned on a ceramic carrier with recesses. Preferably, wires of the film resistors are placed in grooves of the ceramic carrier and embedded there, in particular with glass.

An especially simple contact to terminal, in particular by crimped sleeves having a welding surface, lines can be formed when the wires of the film resistor project to the end of the ceramic carrier set opposite the measurement-active part of the film resistor. The ceramic carrier preferably has particularly low heat conductivity, in that it is made, for example, of steatite and thus conducts only little heat to the plastic housing. According to the invention, if an intense contact with hot exhaust gas is avoided by the metal cap as shielding, then an injection moldable plastic stable up to 230° C., for example PPS, could be used as the housing material. According to the invention, this opens up all of the advantages of injection-molding technology. Preferably, the plastic housing therefore lies outside of the stream cross section of the exhaust-gas pipe.

According to the invention, the ceramic carrier could also be mounted and sealed on the plastic housing with a heat-resistant elastomer, such as silicon rubber or Viton. Preferably, the seal is non-compressible, such as, for example, silicon rubber, and is sealed with pressures up to 6 bar.

The film resistors have track conductors mounted on a substrate, in particular a ceramic plate and on which the measurement-active resistor is formed. These track conductors are preferably thin structured films, in particular made of platinum. Film resistors with terminal wires, which fix the terminal wires mounted on contact fields with a tension-relieving device made of glass, have proven particularly effective for the present invention.

A measurement device according to the invention, in particular an anemometric measurement device, for use in an exhaust-gas pipe, in particular an exhaust-gas recirculation pipe, embeds a ceramic carrier, in particular a plate, in an injection-molded housing, so that at least one film resistor is mounted on the ceramic carrier on the end set opposite the embedding, and wires lead out from this to the embedded end of the ceramic carrier. The wires are connected to electrical connections, which are guided through the injection molding, and are then sealed and fixed within the injection-molded part.

Preferably:
additional components or materials are used for the sealing and mounting;
the film resistor is mounted and sealed on the ceramic carrier with glass compound;
the carrier and the injection-molded housing are sealed relative to each other with a seal;
the wires of the film resistors are covered in the embedded region of the carrier by sealing compound;
the injection-molded housing has a flange;
the contact region of the wires of the film resistor with the electrical connections on the end of the carrier set opposite the measurement resistor is sealed with a sealing compound against the carrier and the housing;
the wires lie in recesses of the carrier; and
the film resistor has a measurement resistor connected to wires, which are sheathed in the region of the carrier with glass sheathing.

For the production of the measurement device, the wires are embedded on the carrier, in particular the plate, with a glass compound, the glass compound is fired on this plate, and after the firing, the wires are detached from the glass sheathing by cooling, so that these wires can move in the axial direction in the glass sheathing.

The measurement device is pushed with its metallic housing into an exhaust-gas pipe, without the metallic housing contacting the exhaust-gas pipe. The metallic housing is placed on the plastic housing, which is sealed and fixed directly or with a seal on a flange on the exhaust-gas pipe.

The mounting device of a measurement device, in particular an anemometric measurement device, in an exhaust-gas pipe, in particular an exhaust-gas recirculation pipe, is constructed according to the invention so that the metallic shielding is spaced apart with a gap from the exhaust-gas pipe, in particular its connecting piece, for the measurement device, so that there is no metallic contact between the housing and the exhaust-gas pipe in the upper half of the exhaust gas pipe-side connecting piece set on the exhaust-gas pipe, and the plastic housing contacts directly or with a seal on a flange or on the end of the connecting piece of the exhaust-gas pipe.

The measurement device has a film resistor, which is fixed on a ceramic carrier and wherein the ceramic carrier is held by a plastic housing on the side set opposite the functional measurement resistor of the film resistor, wherein this plastic housing is sealed against the carrier with a sealing material, and on which a metallic shielding is fixed, which shields the carrier and the film resistor up to its region of the functional measurement resistor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 2 and 2A are side and top views of an anemometer according to FIGS. 1 and 1A;

DETAILED DESCRIPTION OF THE INVENTION

Figure 1:
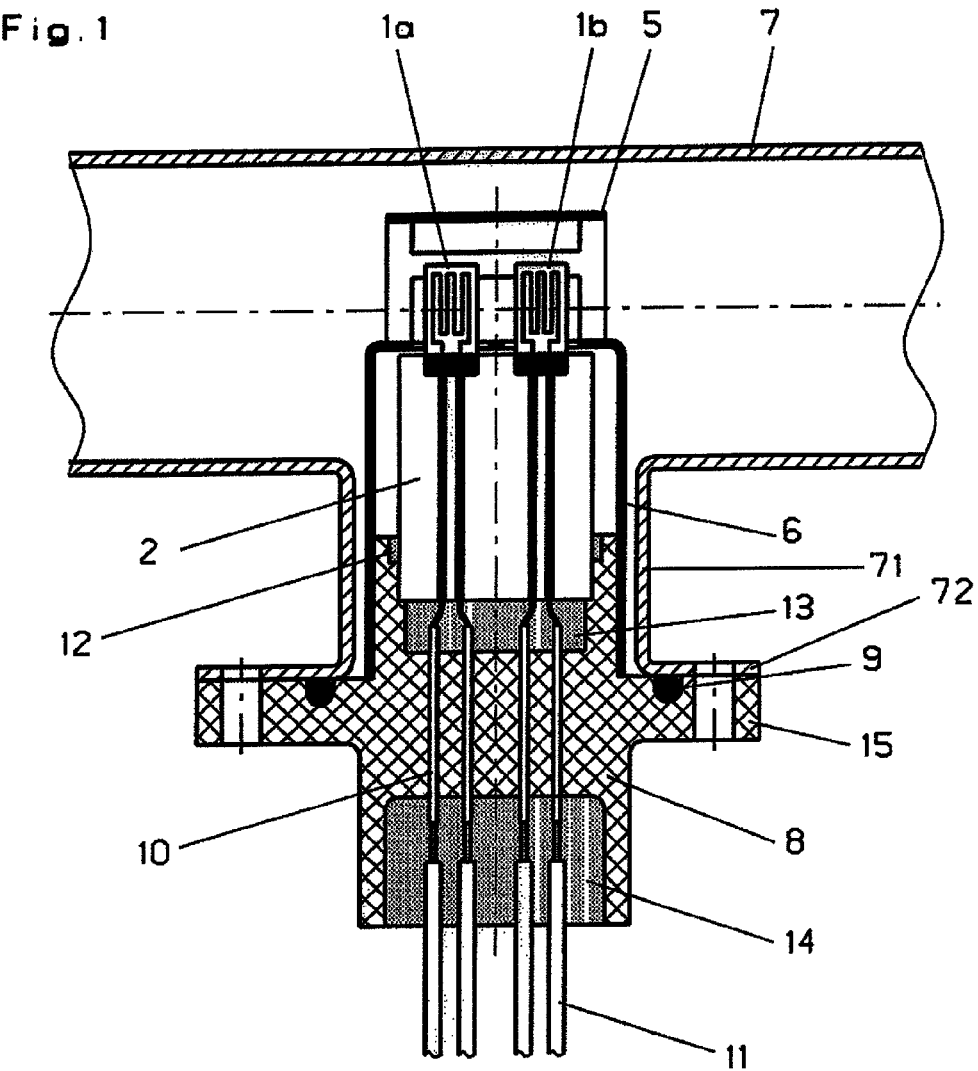
FIGS. 1 and 1A are sections of an anemometer according to one embodiment of the invention, mounted in an exhaust-gas pipe, in side and top views.
Figures 3, 3A:
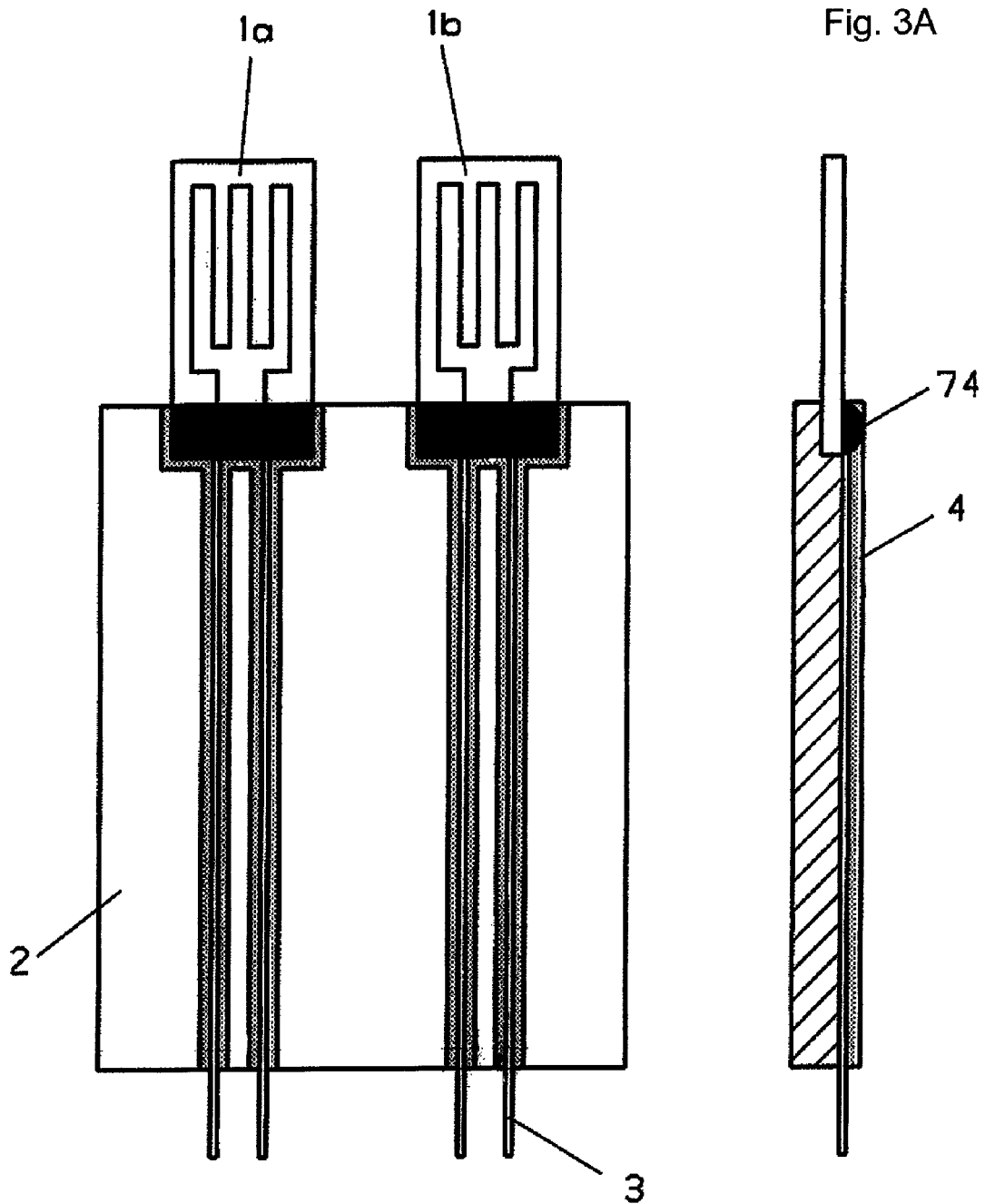
FIGS. 3 and 3A are top and side sectional views of an arrangement of two film resistors on a ceramic carrier.

In the arrangement according to FIGS. 1-3, thin-film measurement elements $1a$ and $1b$ are arranged in the exhaust-gas pipe 7. The thin-film measurement elements $1a$ and $1b$ are each part of film resistors that are mounted in recesses of a ceramic carrier 2 and whose wires 3 are set in grooves of the ceramic carrier 2 formed as a plate. The wires 3 are fused in the region of the grooves with a glass compound 4, so that they contract after the cooling of the glass melt to the extent that they can move in the axial direction within the remaining glass sheathing 4. The wires 3 of the film resistors are connected electrically to the thin-film measurement elements $1a$ and $1b$ and tension is reduced in these wires by a fixing drop 74.

On the cold end of the carrier 2, the wires 3 are sealed with a silicon seal 13 against the housing 8. The ceramic carrier 2 is sealed with a silicon seal 12 against the plastic housing 8, in order to prevent the entry of media, e.g., exhaust gas or soot from the exhaust-gas pipe into the plastic housing 8 and thus the formation of parallel resistors. The plastic housing 8 is an injection-molded part made of PPS. Metallic shielding 6 protects the injection-molded part 8 from overheating by the exhaust gas. In this way, an air gap remains between the shielding 6 and the mounting flange of the exhaust-gas pipe 7, in order to prevent contact of the exhaust-gas pipe 7 with the shielding 6. The injection-molded part 8 is mounted on the flange 72 of the exhaust-gas pipe 7 and is sealed with an O-ring 9.

The electrical connections 10 arranged within the injection-molded part 8 connect the wires 3 to the terminal lines 11. The terminal lines 11 are sealed in the region of the plastic housing 8 with a seal 14, in order to prevent the entry of media, e.g., salt water, outside of the exhaust-gas pipe and to exclude the formation of parallel resistors due to electrically conductive media. The seal 14 can be produced by casting with sealing compound or by injection molding in an injection-molding machine.

Figure 1A:
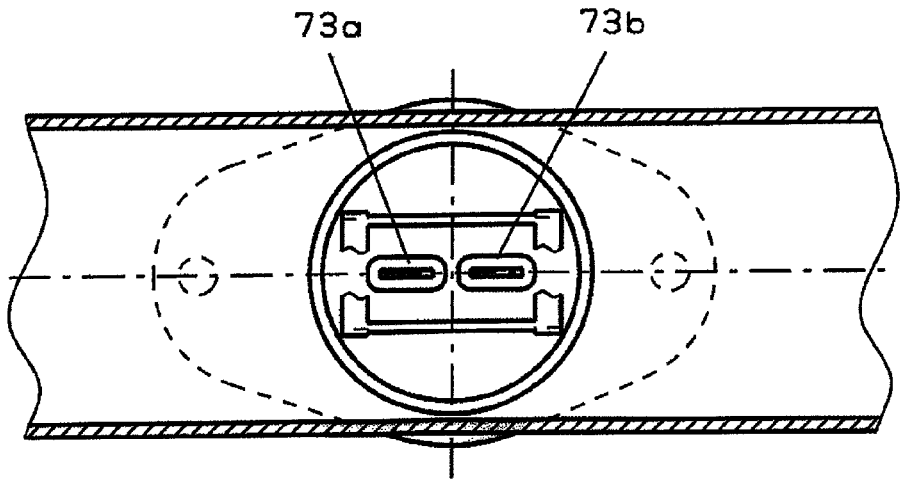

In FIGS. 1 and 1A, the measurement elements project from the film resistors $1a$ and $1b$ through the slots $73a$, $73b$ of the shielding 6. The shielding and film resistors do not contact each other. Consequently, the film resistors are neither mechanically loaded nor thermally coupled. The gap between the measurement element and the shielding 6 is kept as small as possible, so that the exhaust gas flowing past in the exhaust-gas pipe generates as little turbulence as possible in this opening. Therefore, the air insulation between the carrier 2 and the shielding 6 is negatively affected as little as possible. The seals 13 and 14 stop gas flows, so that the air between the carrier 2 and the shielding 6 acts as a heat-insulating air cushion.

The side view of FIG. 2 illustrates, without the shielding 6 from FIG. 1, how the film resistors mounted on the carrier 2 are arranged with their wires 3 and the carrier 2 in the injection-molded housing 8 and are sealed with the seal 13. In the top view of FIG. 2A can be seen the embedding of the carrier 2 in the injection-molded housing 8 and the seal 12 with which the carrier 2 is sealed against the housing 8. The seal 12 can be produced by casting with sealing compound. In this way, the carrier is mounted in a particularly stable way in the housing. Furthermore, the seal prevents the entry of media between the carrier and the housing.

The film resistors $1a$ and $1b$ according to FIGS. 3 and 3A consist of a substrate and a thin-film track conductor arranged on this substrate. These film resistors are connected electrically with wires 3. Tension on the wires 3 is reduced by a fixing drop 74. Here, the film resistors $1a$ and $1b$ are arranged with their tension-reducing devices in recesses of the carrier 2, and the wires 3 of the film resistors are set in grooves of the carrier 2. A glass sheathing 4, in which the wires can move in the axial direction, is created around the wires 3.

For this purpose, both the recess and also the grooves are filled with glass paste. When the glass paste melts, the region of the tension-reducing device of the thin-film measurement elements $1a$ and $1b$ is connected rigidly to the ceramic carrier 2, and the glass in the grooves of the carrier 2 surrounds the wires 3, which are thus held in the sheathing and are sealed against the medium in the exhaust-gas pipe. When the glass cools, the wires 3 contract, so that the wires 3 can move in the axial direction in the glass sheathing 4. In this way, stresses due to the different coefficients of expansion of the glass sheathing 4 and wires 3 are reduced.

Figure 4:
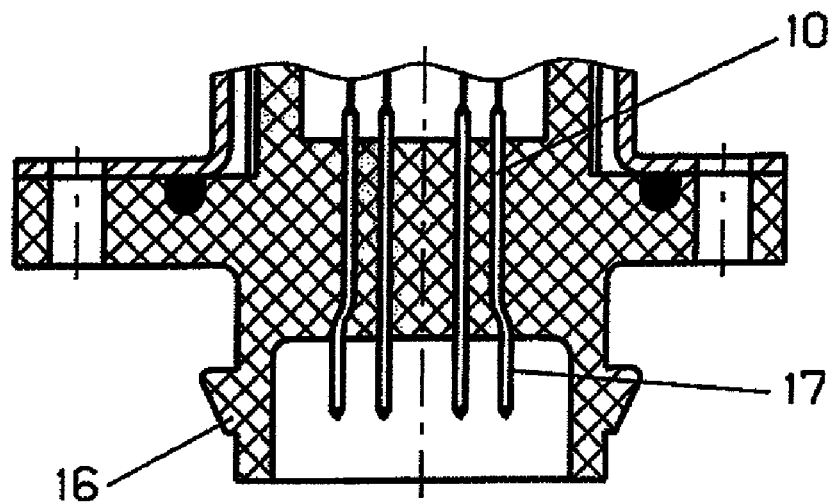
FIG. 4 is a side sectional partial view showing contacts of the wire ends of the film resistors with connections formed as plug-in contacts.

According to FIG. 4, the terminal region is formed with plug-in contacts 17 and a plastic border with catch hooks 16 as terminal plugs. An injection of plastic around solid contact pins causes a reduction in tension in the terminals and also seals these parts. In the plug-in connection made possible in this way, the parts to be inserted one in the other are preferably sealed against each other with a seal. According to FIG. 4, the electrical connections 10 could also be constructed as a lead frame, in order to widen the spacing of the terminal wires 3 to the spacing of the terminal lines 11, without thereby having to bend the terminal wires 3 apart from each other.

Figure 5:
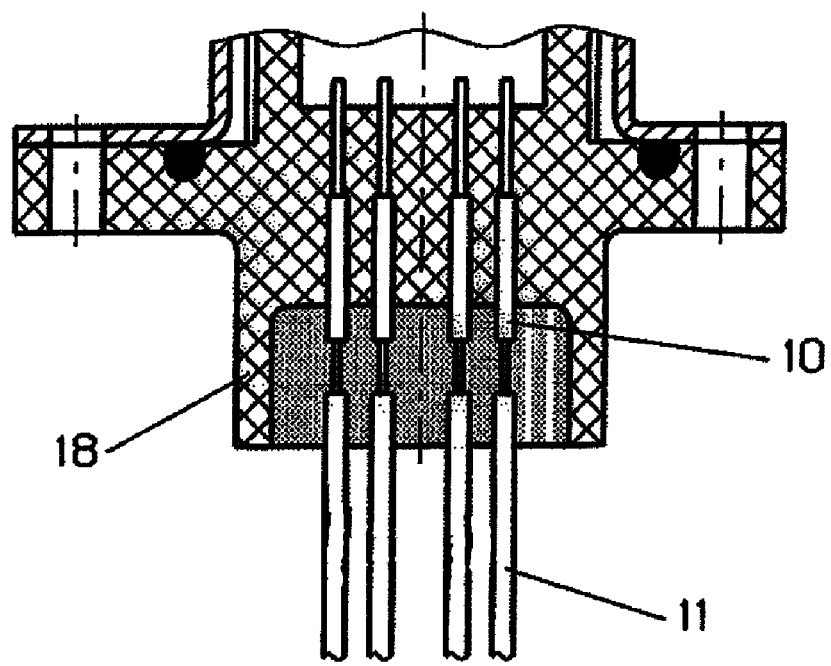
FIG. 5 is a side sectional partial view showing contacts of the wire ends of the film resistors by electrical connections to the terminal lines.

According to FIG. 5, the cable outlet region 18 is continued electrically by means of terminal lines 11. In this way, an additional plug-in connection is spared.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A measurement device for use in an exhaust-gas pipe, the device comprising a ceramic carrier having an end embedded in an injection-molded housing made of plastic, at least one film resistor mounted on a second end of the ceramic carrier opposite the embedded end, wherein electrical connections lead out from the at least one film resistor to the embedded end of the ceramic carrier, wherein the electrical connections are guided through the injection molding, sealed and mounted within the injection-molded housing, and optional additional components for the sealing and mounting.

2. The measurement device according to claim 1, wherein the film resistor is mounted and sealed with glass compound on the ceramic carrier.

3. The measurement device according to claim 1, wherein the ceramic carrier and the injection-molded housing are sealed against each other with a seal.

4. The measurement device according to claim 1, wherein the electrical connections are covered in a region of the embedded end of the carrier by a sealing compound.

5. The measurement device according to claim 1, wherein the injection-molded housing has a flange.

6. The measurement device according to claim 1, wherein the electrical connections are sealed with a sealing compound against the ceramic carrier and the housing on the embedded end of the ceramic carrier.

7. The measurement device according to claim 1, wherein wires of the electrical connections lie in recesses of the ceramic carrier.

8. The measurement device according to claim 7, wherein the film resistor has a measurement resistor connected to the wires, which are surrounded with glass sheathing in a region of the ceramic carrier.

9. The measurement device according to claim 1, wherein the ceramic carrier has a form of a plate.

10. The measurement device according to claim 1, wherein the device is an anemometric measurement device.

11. The measurement device according to claim 1, wherein the exhaust-gas pipe is an exhaust-gas recirculation pipe.

12. A method for production of a measurement device according to claim 7, comprising embedding the wires on the ceramic carrier with a glass compound to form a sheathing, firing the glass compound on the ceramic carrier, and after the firing, detaching the wires from the glass sheathing by cooling to an extent that the wires remain axially movable in the glass sheathing.

13. A method for mounting the measurement device according to claim 1, comprising inserting the measurement device with a metallic housing into an exhaust-gas pipe, without the metallic housing touching the exhaust-gas pipe, and placing the metallic housing on a plastic housing, which is sealed and mounted directly or with a seal on a flange on the exhaust-gas pipe.

14. A mounting of a measurement device in an exhaust-gas pipe, wherein the measurement device comprises a film resistor mounted on a ceramic carrier and the ceramic carrier is held by a plastic housing on a side opposite a functional measurement resistor of the film resistor, wherein the plastic housing is sealed against the ceramic carrier with a sealing material, and a metallic shielding mounted on the plastic housing to shield the ceramic carrier and the film resistor up to a region of the functional measurement resistor, wherein the metallic shielding is spaced apart with a gap from a piece of the exhaust-gas pipe connecting the measurement device, such that there is no metallic contact between the plastic housing and the exhaust-gas pipe in an upper half of the exhaust-gas pipe connecting piece, and the plastic housing contacts a flange or an end of the connecting piece of the exhaust-gas pipe directly or with a seal.

15. The mounting according to claim 14, wherein the device is an anemometric measurement device.

16. The mounting according to claim 14, wherein the exhaust-gas pipe is an exhaust-gas recirculation pipe.

\* \* \* \* \*